Nov. 25, 1941.  W. L. McGRATH  2,263,929
AIR CONDITIONING SYSTEM
Filed May 14, 1938  4 Sheets-Sheet 1

Inventor
William L. McGrath
By George H. Fisher
Attorney

Nov. 25, 1941.     W. L. McGRATH     2,263,929
AIR CONDITIONING SYSTEM
Filed May 14, 1938     4 Sheets-Sheet 3

Inventor
William L. McGrath
By George H Fisher
Attorney

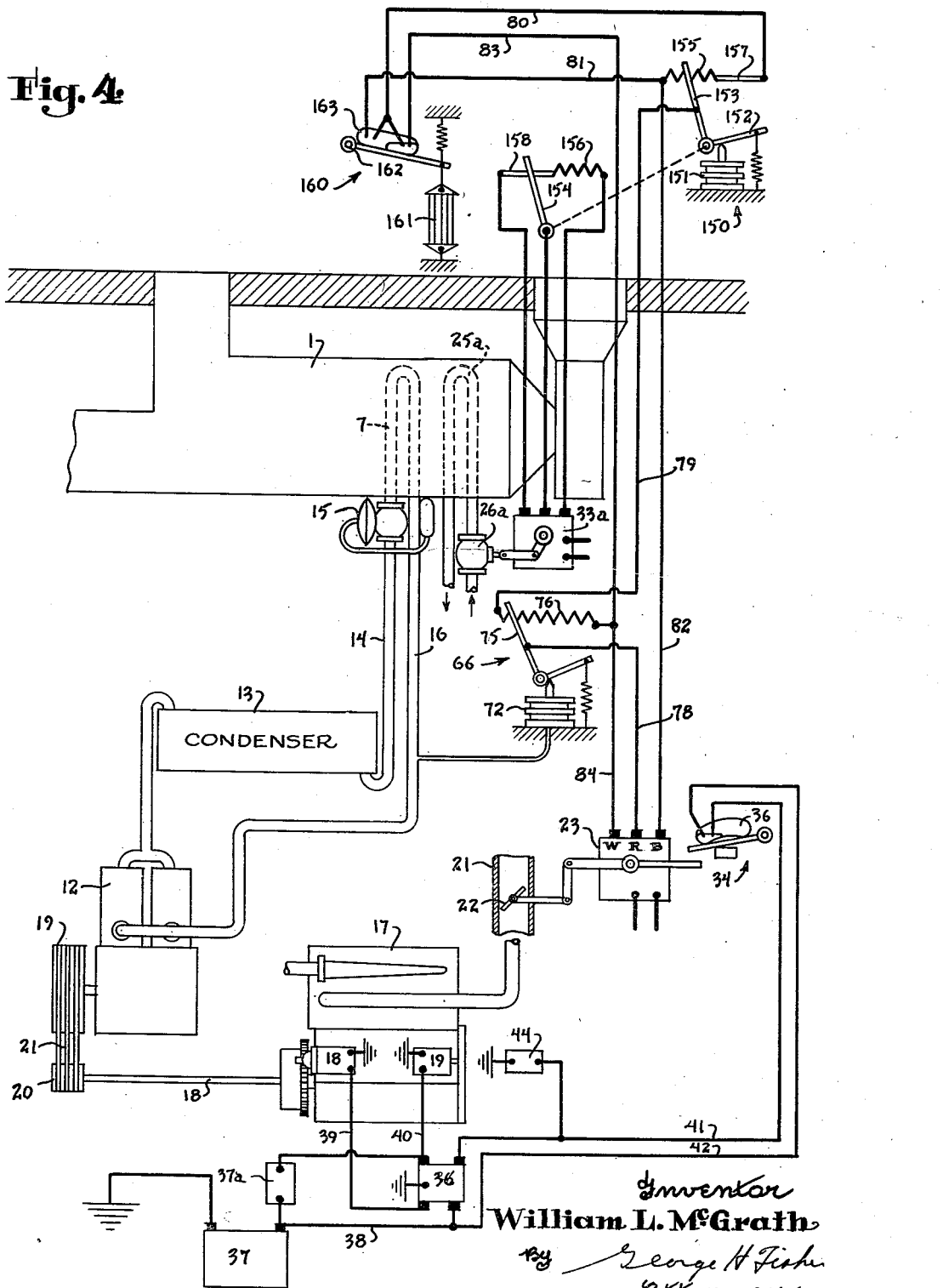

Patented Nov. 25, 1941

2,263,929

UNITED STATES PATENT OFFICE 2,263,929

AIR CONDITIONING SYSTEM

William L. McGrath, St. Paul, Minn., assignor to Minneapolis-Honeywell Regulator Company, Minneapolis, Minn., a corporation of Delaware Application May 14, 1938, Serial No. 208,090

16 Claims. (Cl. 257—3)

This invention relates to air conditioning and is more particularly concerned with automatic control systems for air conditioning systems.

It is an object of this invention to provide an automatic control system for air conditioning systems of the type utilizing variable capacity compressors, which controls the compressor capacity in a manner to maintain proper conditions within the conditioned space and within the air conditioning apparatus.

Another object of this invention is the provision of an air conditioning system having a variable capacity compressor with a control arrangement for operating the compressor at low capacity when the space temperature is at an intermediate value and the relative humidity is not excessive, and which operates the compressor at high capacity when either temperature or humidity becomes excessive.

A further object of this invention is to provide an automatic control system for air conditioning systems utilizing a variable capacity compressor, which varies the compressor capacity in accordance with space temperature and which operates the compressor at maximum capacity when the space relative humidity becomes excessive.

Another object of this invention is the provision of an air conditioning system having a variable capacity compressor and a by-pass for the cooling coil, in which the compressor output and the air flow across the coil are graduatingly varied in accordance with variations in temperature, and in which the compressor is operated at higher capacity when the humidity becomes excessive.

A further object of this invention is the provision of a system of this type with a reheater which is controlled in sequence with the compressor and air flow controller in accordance with variations in the condition of the air in the conditioned space.

Another object of this invention is to provide an air conditioning control system which utilizes a variable capacity compressor and a cooling coil provided with damper means for controlling the flow of air across said coil, which controls the damper means in accordance with temperature variations, which controls the compressor capacity in accordance with humidity variations, and which prevents operation of the compressor when the damper means is moved to a predetermined position.

A still further object of this invention is the provision of an automatic control system which is especially adapted for systems utilizing internal combustion engine driven compressors, and which automatically varies the engine speed and starts and stops the engine in a manner to maintain proper conditions within the conditioned space.

Other objects of this invention will become apparent from the following description and the appended claims.

For a full disclosure of my invention, reference is made to the following detailed description and to the accompanying drawings, in which Figure 1 illustrates diagrammatically an air conditioning control system embodying the features of my invention as applied to a system utilizing reheat;

Figure 4 shows still another modification of my improved control system.

Figure 1:
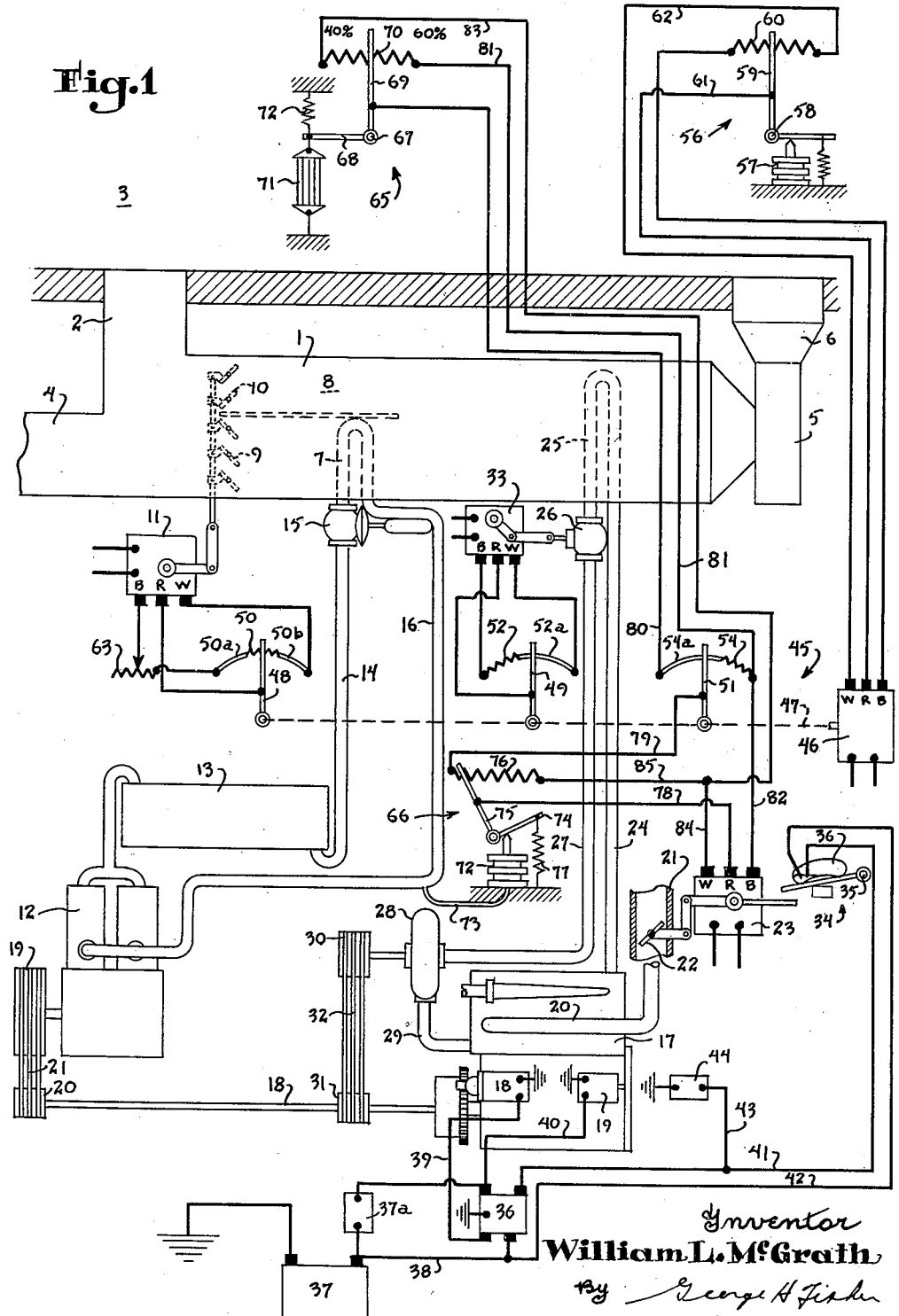

Referring to Figure 1, reference character 1 indicates an air conditioning chamber connected to a return duct 2 leading from a space to be conditioned 3, and to a fresh air inlet duct 4. The discharge end of chamber 1 is connected to a fan 5 which causes air to flow through the chamber 1 and to be discharged into the space 3 through a discharge duct 6. Located within chamber 1 is a cooling coil 7, this coil extending but part way across chamber 1 to provide a by-pass passage 8. The flow of air across cooling coil 7 and through by-pass 8 is controlled by means of a set of face and by-pass dampers 9 and 10 which are actuated through a suitable linkage by means of a proportioning motor 11.

The cooling coil 7 forms a part of a compression refrigeration system having a compressor 12 and a condenser 13 which is connected by pipe 14 to the expansion valve 15 at the inlet of coil 7. The outlet of coil 7 is connected to the compressor 12 by means of a suction line 16. The operation of compression refrigeration systems of this type is well understood in the art.

Compressor 12 is driven by means of an internal combustion engine generally indicated as 17 through any suitable means such as drive-shaft 18 and pulleys 19 and 20 over which run belts 21. The engine 17 may be of any desired type and is illustrated as including a starting motor 18, a generator 19 and an intake manifold 20 having a fuel inlet pipe 21 and a throttle valve 22. The throttle valve 22 is actuated by means of a proportioning motor 23. Attached to the water jacket outlet of the engine 17 is a pipe 24 which leads to a reheater coil 25 located within the conditioning chamber 1. This reheater coil is connected to a valve 26 for controlling the flow of heating medium therethrough, and this valve 26 is connected by pipe 27 to the inlet of pump 28 which in turn is connected by pipe 29 to the water jacket inlet of engine 17. The pump 28 may be driven by the engine 17 by means of pulleys 30 and 31 over which run belts 32. The valve 26 for controlling the flow of heating medium through reheater 25 may be positioned by means of a proportioning motor 33. It will be understood that engine 17 is also provided with any suitable arrangement for supplying cooling water thereto in addition to reheater 25 such as a radiator.

Reference character 34 indicates an auxiliary switch which is actuated by the throttle valve motor 23. This auxiliary switch is diagrammatically illustrated as comprising a pivoted switch carrier 35 carrying a mercury switch 36. The switch carrier 35 is actuated by the throttle valve motor in a manner to cause the mercury switch 36 to be tilted to closed position whenever the throttle valve 22 is opened to a predetermined position while causing switch 36 to be tilted to open position when the throttle valve 22 is closed to a predetermined minimum position. The auxiliary switch 34 is provided for controlling the ignition system and an automatic starting system for engine 17.

Referring now to the engine ignition and starting circuit, reference character 36 indicates an automatic starting relay which is adapted to energize the starting motor 18 when the engine ignition circuit is closed and to deenergize the starting motor 18 when the engine 17 starts. This automatic starting relay 36 may be of the type shown and described in the L. K. Loehr et al. Patent No. 1,773,913, issued August 26, 1930. This relay controls the current flow to the starting motor 18 from a storage battery 37 and for this purpose is provided with terminals connected by wires 38 and 39 to battery 37 and starting motor 18, respectively. This relay is also adapted to deenergize the starting motor 18 when the engine starts as evidenced by operation of the generator 19 and for this purpose is provided with a terminal connected by wire 40 to the generator 19. This terminal is also connected through reverse current relay 37a to the storage battery 37. Relay 36 is also provided with a control terminal connected by wire 41 to auxiliary switch 34, this switch being in turn connected by wires 42 and 38 to the storage battery 37. The wire 41 is also connected to a wire 43 leading to an ignition coil 44.

When the engine throttle valve 22 is open to a predetermined position, the auxiliary switch 34 will close which will complete a circuit from battery 37 through wires 38, 42, auxiliary switch 34 and wire 41 to the control terminal of starting relay 36, and also to the ignition coil 44. Relay 36 in response to this energization will cause energization of starting motor 18 for starting the engine. When the engine starts, relay 36 will automatically deenergize starting motor 18 and maintain this motor deenergized so long as the engine is in operation. The engine 17 will then operate at varying speeds as determined by the position of the throttle valve until such time as the throttle valve is closed to its minimum position, which will cause opening of auxiliary switch 34 and stopping of the engine.

The proportioning motors 11, 23, and 33 are preferably of the type shown in Patent No. 2,028,110, issued to Daniel G. Taylor on January 14, 1936. This type of proportioning motor is provided with three control terminals indicated as R, W, and B and is adapted to assume intermediate positions depending upon the relative values of resistance connected between terminals R and W and between terminals R and B. For instance, if equal values of resistance are connected between terminals R and W and between terminals R and B, the motor will assume midposition. If the resistance between terminals R and B is increased or the resistance between terminals R and W is decreased, the motor will run in one direction to a new position, and if the resistance between terminals R and W is increased or the resistance between terminals R and B is decreased, the motor will run in the opposite direction to a new position.

The proportioning motors 11, 23, and 33 are controlled by means of a step controller 45 which comprises a proportioning motor 46 having an operating shaft 47 upon which are mounted sliders 48, 49, and 51. The slider 48 cooperates with a resistance 50 to form a control potentiometer for controlling the damper motor 11. This resistance is connected at each end to contact segments 50a and 50b. The slider 49 cooperates with a resistance 52 to form a control potentiometer for the proportioning motor 33. This resistance is connected at its right-hand end to contact segment 52a. The slider 51 cooperates with a resistance 54 for forming a potentiometer for in part controlling the throttle valve motor 23. This resistance 54 is connected at its left-hand end to a contact segment 54a.

The proportioning motor 46 is controlled by means of a space thermostat 56 which is indicated diagrammatically as comprising a bellows 57 actuating a bell crank lever 58 having one arm forming a slider 59 cooperating with a resistance 60 to form a control potentiometer. The bellows 57 contains a volatile fluid for causing it to expand and contract upon change in temperature. When the space temperature is below a predetermined value such as 72° F. the slider 59 will engage the right-hand end of resistance 60 which will complete a substantially short-circuit from terminal R of motor 46 through wire 61, slider 59 and wire 62 to terminal W of motor 46 while the entire resistance 60 will be connected between terminals R and B. This will cause the motor 46 to rotate shaft 47 to its extreme counter-clockwise position at which slider 48 engages the left-hand end of contact segment 50a, slider 49 engages the left-hand end of resistance 52 and slider 51 engages the left-hand end of contact segment 54a. Due to slider 48 engaging contact segment 50a, terminals R and B of damper motor 11 will be substantially short-circuited for causing this motor to assume a position in which the by-pass damper 10 is wide open and the face damper 9 is almost closed. Due to the action of rheostat 63 which is connected to terminal B of motor 11, this motor will not assume an extreme position and therefore the face damper 9 will remain slightly open for permitting a small volume of air to flow across the cooling coil 7. Due to slider 49 engaging the left-hand end of resistance 52, terminals R and B of motor 33 will be substantialy short-circuit for causing this motor to completely open valve 26. The engagement of slider 51 with contact segment 54a will place the throttle valve motor 23 under the control of a humidity controller 65 as will be presently described.

If the space temperature increases above 72° F. the slider 59 will move to the left across resistance 60 for causing clockwise rotation of shaft 47, this causing slider 49 to move to the right across resistance 52 thus closing valve 26. When the space temperature increases to 75° F. the slider 49 will reach the right-hand end of resistance 52 thus causing the motor 33 to close valve 26 completely. Upon further increase in temperature the slider 46 will begin traversing resistance 50, this causing the motor 11 to begin opening face damper 9 and closing by-pass damper 10. At this time sliders 49 and 51 will be traversing contact segments 52a and 54a. When the space temperature rises to 78° F. the slider 48 will engage the right-hand end of resistance 50 which will cause the face damper 9 to be wide open and the by-pass damper 10 to be closed. Upon further increase in temperature, the slider 51 will begin traversing resistance 54 and this in a manner which will be described will cause the engine speed to be increased.

Referring now to the controls for the engine throttle valve motor 23, this motor in addition to being controlled by the step controller 45 is also controlled by the humidity controller 65 and by a suction pressure controller 66. The humidity controller 65 is diagrammatically indicated as comprising a bell crank lever 67 having an actuating arm 68 and a control arm forming a slider 69 which cooperates with a resistance 70. The arm 68 is actuated by means of a humidity responsive device 71 which may comprise a plurality of strands of hair or other moisture responsive material. A spring 72 is indicated for urging arm 68 upwardly to maintain the strands 71 taut. The strands 71 will increase in length upon increase in relative humidity, thus causing movement of arm 61 to the right across resistance 70. Upon a decrease in humidity the arm 69 will move to the left across resistance 70. This instrument may be so designed and adjusted as to cause slider 69 to engage the right-hand end of resistance 70 when the relative humidity reaches a value of 60% while engaging the left-hand end of resistance 70 when the relative humidity is at 40%.

Referring to the suction pressure controller 66, this instrument may comprise a bellows 72 connected by a tube 73 to the suction line 16. This bellows may actuate a bell crank lever having an actuating arm 74 and a slider 75 cooperating with a resistance 76. The actuating arm 74 is biased against bellows 72 by a spring 77. When the suction pressure in the refrigeration system is at a relatively high value, the bellows 72 will be expanded to a maximum for maintaining the slider 75 in contact with the left-hand end of resistance 76. If the suction pressure falls below a minimum value wherein frost may form on the surfaces of coil 7, then bellows 72 will contract under the action of spring 77 for permitting movement of slider 75 to the right across resistance 76.

Referring to the wiring between motor 23 and the controllers 45, 65, and 66, it will be noted that terminal R of the motor is connected by wire 78 to slider 75 of the suction pressure controller 66 while the left-hand end of the resistance 76 is connected by wire 79 to slider 51. The left-hand end of contact segment 54a is connected to the slider 69 of humidity controller 65 by wire 80. By this arrangement, whenever the suction pressure is above the low limit setting of controller 66, and when the space temperature is below 78° F., the slider 69 of the humidity controller 65 is directly connected to terminal R of motor 23. The right-hand end of resistance 70 is connected to terminal B of motor 23 by wires 81 and 82, while the left-hand end of this resistance is connected to terminal W of motor 23 by wires 83 and 84. Therefore, at this time the humidity controller 65 is in complete control of the engine throttle valve motor 23.

Upon an increase in relative humidity within the space the slider 69 will move to the right across resistance 70 and this will decrease the portion of resistance 70 which is connected between terminals R and B and will increase the portion of this resistance connected between terminals R and W. This will cause motor 23 to follow up movement of slider 69 in a direction for opening throttle valve 22 an amount proportionate to the movement of slider 69. Therefore, upon an increase in relative humidity within the space, the engine speed will be increased. This increase in engine speed will reduce the pressure of the refrigerant within cooling coil 7 thus lowering the temperature of this cooling coil and increasing the amount of dehumidification performed. Upon a decrease in relative humidity the slider 69 will move to the left across resistance 70, this causing motor 23 to move throttle valve 22 towards closed position for decreasing the engine speed.

In the event that the space temperature rises to a value above 78° F., the slider 51 will begin traversing resistance 54, this inserting a portion of the resistance 54 into circuit with the slider 69 of the humidity controller 65. Due to the right-hand end of resistance 54 being connected to terminal B of the motor by wire 82, the slider 51 in traversing resistance 54 to the right will decrease the portion of resistance 54 which is connected between terminals R and B of motor 23. This action will cause movement of the throttle valve motor for opening throttle valve 22, independent of the action of humidity controller 65. When the space temperature rises to 80° the slider 51 will engage the right-hand end of resistance 54 thus completing a short-circuit between terminals R and B and causing motor 23 to open throttle valve 22 completely. The arrangement just described, therefore, provides for placing the throttle valve under the control of the humidity controller 65 when the space temperature is below 78° F. while opening the throttle valve independently of the humidity controller when the space temperature begins rising above 78° F.

In the event that the suction pressure within the refrigeration system should become too low due, for instance, to restriction of air across cooling coil 7 by the face damper 9, the slider 75 of the suction pressure controller 66 will begin moving to the left across resistance 76. The right-hand end of resistance 76, it will be noted, is connected directly to terminal W of motor 23 by wires 84 and 85. Therefore when the suction pressure is above the predetermined minimum value, the slider 75 engages the left-hand end of resistance 76 which places the entire resistance 76 between terminals R and W of motor 23. As slider 75 moves to the right across resistance 76 a portion of resistance 76 is connected into circuit with the slider 69 of humidity controller 65 and the portion of resistance 76 which is connected between terminals R and W of the motor 23 is decreased. This decrease in resistance between terminals R and W of motor 23 will cause this motor to move throttle valve 22 towards closed position. When the suction pressure falls to a value low enough to cause slider 75 to engage the right-hand end of resistance 76, terminals R and W of motor 23 will become substantially short-circuited for causing the throttle valve 22 to be completely shut, which will also cause opening of auxiliary switch 34 for stopping the engine. It should be noted that the slider 75 of controller 66 is directly connected to terminal R of motor 23. Consequently the controller 66 is capable of closing the throttle valve 22 irrespective of the positions of sliders 51 and 69 of controllers 45 and 65, respectively.

Operation of Figure 1

With the parts in the positions shown, the space temperature is at approximately 76° F. as indicated by the slider 59 of thermostat 56 engaging the center of resistance 60. This has caused the proportioning motor 46 to assume mid-position, at which slider 48 engages the center of resistance 50, causing damper motor 11 to place the face and by-pass dampers in mid-position. Also, this has caused the slider 49 to engage the contact segment 52a for causing valve motor 33 to close valve 26 completely, thus placing the reheater 25 out of operation. Due to switch arm 51 engaging contact segment 54a and due to slider 75 of suction pressure controller 66 engaging the left-hand end of resistance 76, the humidity controller 65 is in complete control of the throttle valve motor 33. At this time the space relative humidity is at 50% as indicated by slider 69 engaging the center of resistance 70. This has caused the throttle valve motor 33 to assume mid-position, thus causing throttle valve 22 to be half-open. Due to throttle valve 22 being half-open, the auxiliary switch 34 is closed and consequently the engine ignition circuit is closed.

If the space relative humidity should increase, the slider 69 will move to the right across resistance 70 for opening throttle valve 22 wider. This will increase the engine speed thus reducing the temperature of cooling coil 7. This action will increase the amount of dehumidification performed by coil 7 as compared to its cooling action, thereby tending to maintain proper humidity conditions within the space. If the relative humidity should decrease, the humidity controller 65 will cause closing of throttle valve 22 for decreasing the engine speed, thus raising the temperature of cooling coil 7 for decreasing the ratio of dehumidification to sensible heat cooling. If the relative humidity should fall to 40% the controller 65 will cause substantially complete closing of throttle valve 22 and due to the action of the auxiliary switch, the engine 17 will be stopped.

If the sensible or cooling load upon the system increases, the space temperature will begin rising, this causing movement of the slider 48 to the right across resistance 50 which will cause movement of motor 11 for opening face damper 9 and closing by-pass damper 10. This will increase the amount of air passed across cooling coil 7 for increasing the amount of sensible heat cooling performed by coil 7. This action also will increase the amount of refrigerant evaporated within coil 7, thus increasing the pressure within the low pressure side of the refrigeration system and consequently increasing the temperature of the cooling coil 7. This increase in temperature of the cooling coil 7 due to opening of face damper 9 will maintain the dehumidifying action substantially constant. Therefore, as the space temperature increases, the control system will provide for increasing the amount of cooling performed by coil 7 without substantially changing its dehumidifying action. Thus by controlling the engine speed in accordance with relative humidity and by controlling the dampers in accordance with temperature, substantially constant values of temperature and humidity will be maintained within the conditioned space.

During relatively hot and dry weather, the relative humidity controller 65 may not operate the compressor at high enough speed for maintaining the space temperature low enough even when the face damper 9 is wide open. In such event the space temperature will rise above 78° F. which will cause the slider 51 to begin moving to the right across resistance 54. This will increase the engine speed independently of the action of the humidity controller 65 and thus provide for operating the compressor at the necessary speed for preventing overheating of the space.

During relatively cool and damp weather the humidity controller 65 will operate the engine 17 at high speed for reducing the humidity within the space. Due to the weather being cool this action may tend to overcool the space even though the face damper 9 is moved to its minimum position. In such event, the space temperature will begin falling below 75° F. which will cause slider 49 to begin moving to the left across resistance 52. This will cause opening of valve 26 for providing a flow of engine cooling water through the reheater 25, thereby reheating the cooled and dehumidified air and thus preventing overcooling of the space.

In such relatively cool and damp weather the humidity controller 65 might call for operation of the engine at sufficiently high speed as to cause frosting of coil 7 due to the fact that this coil is unloaded by substantial closure of face damper 9. If the suction pressure should begin falling too low due to this or any other cause, the slider 75 of controller 76 will begin moving to the right across resistance 76 for decreasing the engine speed. The controller 66 therefore acts to limit the engine speed sufficiently for preventing the coil 7 from becoming too cold. Due to this modulating action of the controller 66, the engine speed will be progressively lowered as the system becomes unloaded by closure of damper 9 and thus maintain the engine in relatively slow operation for long periods of time at such times, instead of constantly stopping and starting the engine as would occur with a two-position type of controller.

From the foregoing it should be apparent that the control system described operates the engine when either the space temperature or relative humidity becomes excessive and in normal operation varies the amounts of sensible heat cooling and dehumidification performed by the coil 7 by controlling the engine speed and by positioning the face and by-pass dampers. It should also be seen that if the space temperature becomes excessive, the engine speed will be increased regardless of the value of relative humidity within the space and if the space temperature should become too low, the reheater 25 will be placed into operation.

Figure 2

Figure 2:
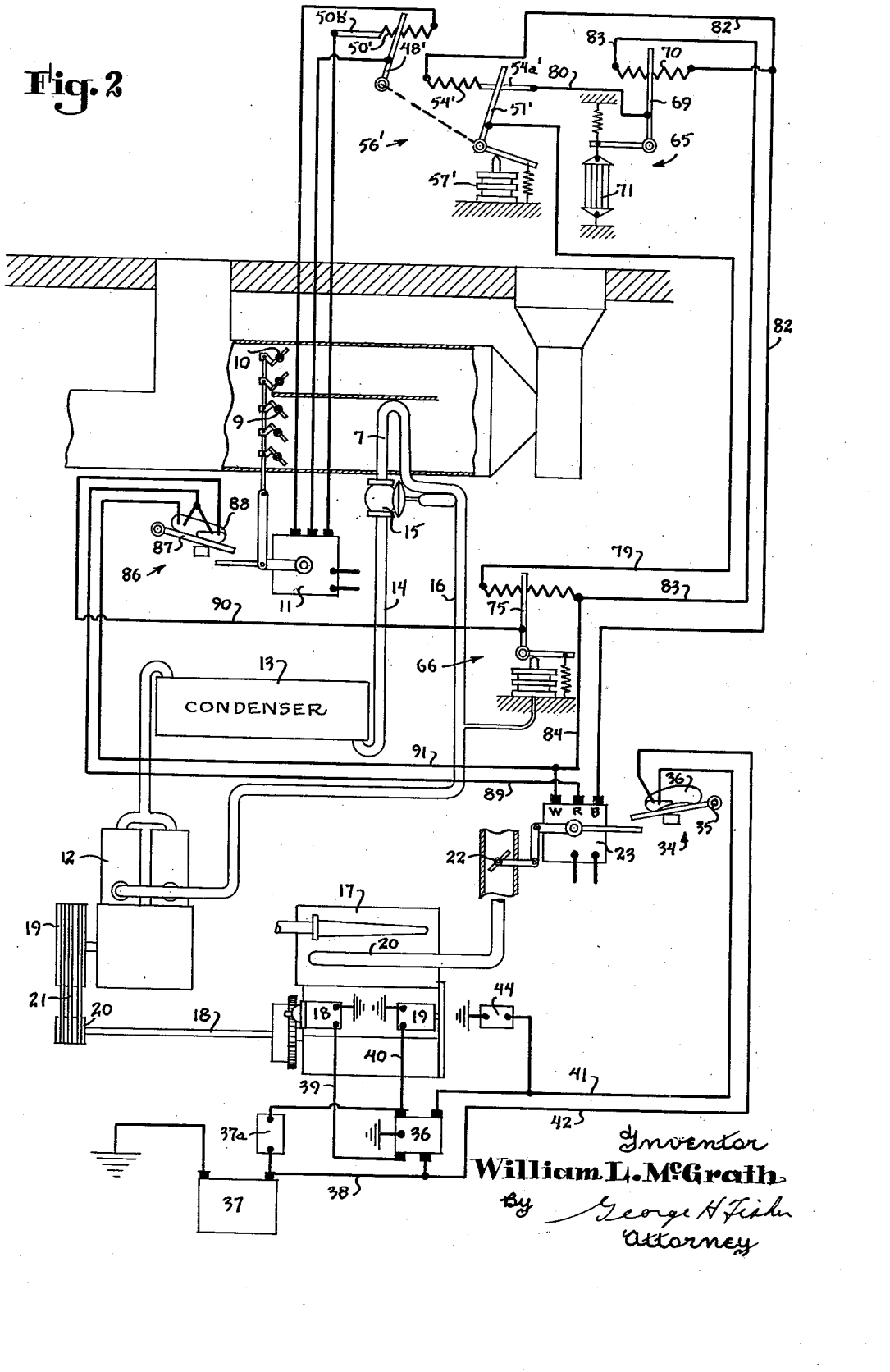
Figure 2 illustrates a modified control system for systems not utilizing reheat.

In some localities having a relatively dry climate it will not be necessary to utilize a reheater for maintaining proper humidity conditions within the space. In such localities a system as shown in Figure 2 may be utilized. Referring to Figure 2, this figure shows substantially the same control system as in Figure 1 but omits the reheater. It is only necessary therefore that the space thermostat control the dampers and the throttle valve motor. This only requires the operation of two potentiometer devices and these may be operated directly by the space thermostat bellows 57', thus eliminating the use of the step controller 45 of Figure 1. In Figure 2 the space thermostat 56' includes a first potentiometer device formed of slider 48', resistance 50', and contact 50b', and a second potentiometer device comprised of slider 51', resistance 54' and contact 54a'. The first potentiometer device controls the damper motor 11 and the second potentiometer device cooperates with the humidity controller 65 and suction pressure controller 66 in controlling the throttle valve motor 23. The operation of these devices is the same as in Figure 1. In other words, when the space temperature is below 78° F. the slider 48' will ride upon resistance 50' for varying the positions of the dampers 9 and 10 in accordance with change in temperature, while the slider 51 will ride upon its associated contact strip 54a' for placing the humidity controller 65 in control of the throttle valve motor 23. When the space temperature rises above 78° F. the face damper 9 will remain in wide open position while the slider 51' will begin moving across resistance 54' for increasing the engine speed as described in detail in connection with Figure 1.

In systems not utilizing a reheater it is desirable to prevent operation of the compressor when the space temperature falls below a predetermined value, in order to prevent overcooling of the space during unusually damp weather conditions. In other words, the compressor should not operate even when the relative humidity is excessive in the event that the space temperature is too low. In order to prevent operation of the engine 17 at this time, an auxiliary switch 86 is provided, this switch being actuated by the damper motor 11. This auxiliary switch is diagrammatically illustrated as comprising a switch carrier 87 which carries a mercury switch 88. The switch carrier 87 is adapted to be actuated by the damper motor 11 in a manner to cause tilting of the switch for bridging its left-hand electrodes when the face damper 9 assumes its minimum open position, while being tilted to bridge its right-hand electrodes whenever the face damper 9 is open further than this minimum position. The mercury switch 88 is connected into the control circuit of the throttle valve motor 23 in a manner to place the controllers 56', 65, and 66 in control of this motor when the damper 9 is away from its minimum position, while closing the throttle valve irrespective of these controllers when the damper 9 is at said minimum position. Referring to the wiring, it will be noted that terminal R of motor 23 is connected by wire 89 to the common terminal of mercury switch 88, while the left-hand electrode of this switch is connected to the slider 75 of suction pressure controller 66 by a wire 90. Thus when the switch 87 is tilted so as to bridge its right-hand electrodes, the control circuit of Figure 2 becomes electrically identical to the system of Figure 1 and hence the humidity controller 65, the thermostat 56' and the suction pressure controller 66 are placed in control of the throttle valve motor 23. The left-hand electrode of mercury swich 88 is connected to terminal W of motor 23 by a wire 91. When the switch 88 is tilted so as to bridge the left-hand electrodes thereof, the sliders of the controllers 56', 65, and 66 will be disconnected from the motor 23 and a direct short-circuit will be completed between terminals R and W of this motor through wires 89 and 91. This will cause the motor to run to its extreme position for completely closing the throttle valve 22 and stopping the engine 17.

Figure 3:
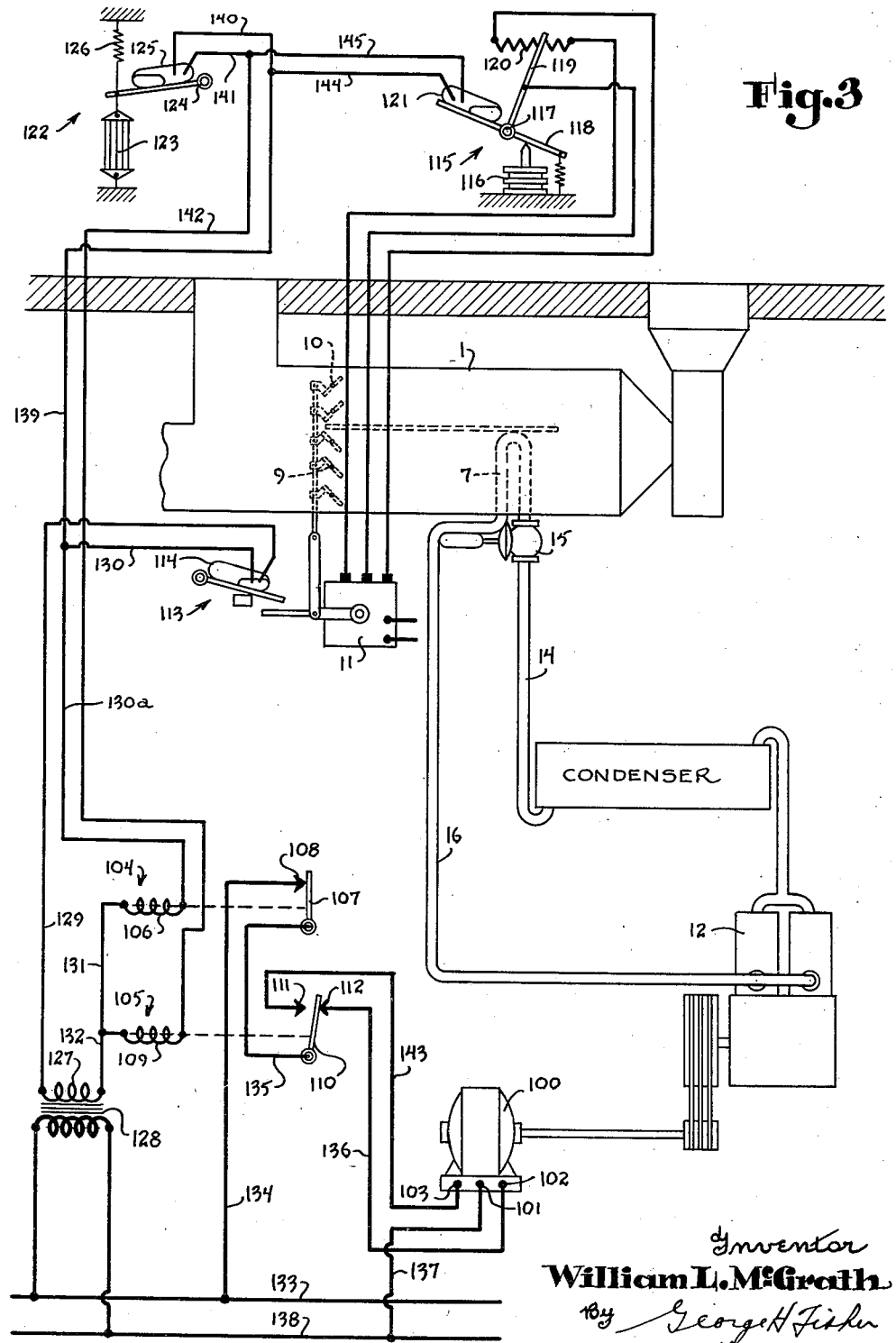
Figure 3 illustrates a modification of the arrangement shown in Figure 2.

*Figure 3*

Referring now to Figure 3, this figure illustrates a system which is similar in operation to the system of Figure 2. Figure 3, however, illustrates the application of my invention to a system utilizing an electric motor for driving the compressor instead of an internal combustion engine as shown in Figure 2. In this figure, reference character 100 illustrates a variable speed electric motor having control terminals 101, 102, and 103. This type of variable speed motor is adapted to operate at low speed when terminal 101 and terminal 102 are connected across a power line, and to operate at high speed when the terminal 101 and terminal 103 are connected to the power line.

The motor 100 is controlled by a pair of relays 104 and 105. The relay 104 may include a relay coil 106 which actuates through a suitable armature a switch arm 107 which cooperates with a contact 108. When coil 106 is energized, switch arm 107 will engage contact 108 while when coil 106 is deenergized the switch arm 107 will disengage contact 108 under the action of gravity or springs, not shown. The relay 105 includes a relay coil 109 which actuates a switch arm 110, which cooperates with an "in" contact 111 and an "out" contact 112. When coil 109 is energized, switch arm 110 will engage contact 111, while when coil 109 is deenergized switch arm 110 will engage contact 112 as shown.

As in the case of Figure 2, the conditioning chamber 1 includes a cooling coil 7, and face and by-pass dampers 9 and 10 therefor which are actuated by a damper motor 11. This damper motor also actuates an auxiliary switch 113 which corresponds to the auxiliary switch 86 of Figure 2. This auxiliary switch 113 is indicated as comprising a mercury switch 114 which is caused to be tilted to closed position, as shown, whenever the face damper 9 is partially opened, while being tilted to open position whenever the face damper 9 is completely closed by the damper motor 11.

The damper motor 11 is controlled by means of a space thermostat 115 which may include a bellows 116 operating a bell crank lever 117 including an actuating arm 118 and a slider 119 cooperating with resistance 120. This thermostat 115 controls the face dampers 9 and 10 in the same manner as the thermostat 56' of Figure 2 controls the face and by-pass dampers of Figure 2. In other words, upon fall in space temperature the slider 119 will move to the right across resistance 120, this causing damper motor 11 to move face damper 9 towards closed position and by-pass damper 10 towards open position. As the space temperature increases, the dampers will be moved in the opposite direction in proportion to the increase in temperature. The thermostat 115 also includes an auxiliary switch 121 which is indicated as being a mercury switch actuated by the bell crank lever 117. This switch is arranged to remain open as shown whenever the slider 119 is away from the extreme left-hand end of resistance 120. When the space temperature rises to such a value as to cause slider 119 to engage the extreme left-hand end of resistance 120, the switch 121 will be tilted to closed position.

Instead of utilizing a modulating type humidity controller as shown in Figure 2, a two-position type humidity controller 122 may be employed. This humidity controller is diagrammatically illustrated as comprising a humidity responsive element 123 which actuates a pivoted switch carrier 124 which carries a mercury switch 125, a spring 126 being provided for maintaining the strands of element 123 taut. When the relative humidity is below a predetermined value such as 50%, the strands 123 will contract sufficiently for tilting switch 125 to open position as shown. However, when the relative humidity rises above this value, the strands 123 will increase in length for tilting switch 125 to closed position.

The operation of Figure 3 is similar to that of Figure 2. With the parts in the positions shown, the relative humidity is below 50% as indicated by the mercury switch 125 being tilted to open position. Also the space temperature is at an intermediate value as indicated by the slider 119 engaging the center of control resistance 120. This has caused the auxiliary switch 121 to be open as shown. This position of slider 119 also has caused the damper motor 11 to move the face and by-pass dampers to intermediate positions. Due to the dampers being in intermediate positions, the mercury switch 114 is tilted to closed position, as shown.

Closure of the mercury switch 114 causes relay 104 to be energized as follows: secondary 127 of step-down transformer 128, wire 129, mercury switch 114, wire 130, wire 130a, relay coil 106, wire 131, and wire 132 to the other side of secondary 127. Energization of relay 104 causes switch arm 107 to engage contact 108 for completing a low speed energizing circuit for motor 100 as follows: from line wire 133, wire 134, contact 108, switch arm 107, wire 135, switch arm 110, contact 112, wire 136, motor terminal 102, motor terminal 101, and wire 137 to line wire 138.

From the foregoing, it will be apparent that when the relative humidity is below a predetermined value and when the space temperature is at an intermediate value, the compressor 12 will be operated at low speed and the space temperature will be controlled by varying the positions of face and by-pass dampers 9 and 10 in accordance with space temperature, the air flow across cooling coil 7 being increased upon increase in space temperature and being decreased upon decrease in space temperature. This operation of the compressor at low speed at this time will cause the cooling coil temperature to be relatively high thereby causing the dehumidifying action of coil 7 to be relatively small, which is the result desired due to the space relative humidity being low at this time.

If the relative humidity should increase above the setting of controller 122 the mercury switch 125 thereof will be tilted to closed position. This will establish an energizing circuit for relay 105 as follows: from transformer secondary 127, wire 129, mercury switch 114, wire 130, wire 139, wire 140, mercury switch 125, wire 141, wire 142, relay coil 109, and wire 132 to secondary 127. Energization of relay 105 will cause switch arm 110 to disengage contact 112 and to engage contact 111. This will complete a high speed energizing circuit for the compressor motor 100 as follows: line wire 133, wire 134, contact 108, switch arm 107, wire 135, switch arm 110, contact 111, wire 143, high speed terminal 103 of motor 100, common terminal 101 and wire 137 to line wire 138. Therefore, when the space relative humidity increases above a predetermined value, the compressor 12 will be operated at high speed. This will cause the temperature of the cooling coil 7 to be reduced, thereby increasing the dehumidifying action of this coil. This will provide for increasing the amount of moisture removed from the air in the space, thus bringing the relative humidity back to the desired value. At this time the face and by-pass dampers 9 and 10 will continue to be positioned by the thermostat 115 for maintaining the space temperature at a proper value.

During relatively hot and dry weather the relative humidity controller 122 may not cause operation of the compressor at high speed. The resulting operation of the compressor at low speed may then be insufficient for carrying the cooling load on the system. In such event, the space temperature will rise to a value which causes the face damper 9 to be wide open and the auxiliary switch 121 to close. This closure of auxiliary switch 121 will complete an energizing circuit for the relay 105 as follows: from transformer secondary 127, wire 129, mercury switch 114, wire 130, wire 139, wire 144, mercury switch 121, wire 145, wire 142, relay coil 109, and wire 132 to secondary 127. This will cause operation of the compressor at high speed for enabling the system to handle the high cooling load which occurs at this time.

In the event that the space temperature falls to a low value such as 75° F., the thermostat 115 will cause damper motor 11 to close face damper 9 and open the by-pass damper 10 wide. This action will cause the mercury switch 114 of auxiliary switch 113 to be tilted to open position. This switch, it will be noted, is connected in series with the energizing circuits for both relays 104 and 105. Thus opening of the auxiliary switch 113 will deenergize relays 104 and 105, this causing the compressor motor 100 to stop. Thus when the space temperature falls to a predetermined minimum value the compressor 12 will be placed out of operation for preventing overcooling of the space, and reducing operating costs of the system.

From the foregoing description it should be apparent that the operation of Figure 3 is similar to that of Figure 2. In other words, when the relative humidity is not excessive the compressor will be operated at low speed and the face and by-pass dampers will be positioned in accordance with space temperature. However, if either the space temperature or the relative humidity becomes excessive, the compressor will be operated at high speed. The use of a two-position humidity controller for increasing the compressor speed to a maximum when the relative humidity becomes excessive, causes the cooling coil 7 to be reduced to the lowest possible temperature whenever there is a call for dehumidification. This operation is advantageous as it causes the relative humidity to be reduced in the shortest possible time. It will be understood that when the cooling coil temperature is decreased, its dehumidifying action increases at a rate faster than its cooling action. Thus upon a call for dehumidification the cooling coil temperature is reduced to a minimum which provides for maximum dehumidification without a corresponding increase in cooling effect of the coil. This action in obtaining maximum dehumidification therefore materially shortens the time that coil 7 must act to dehumidify the space, without a corresponding increase in sensible cooling action. Due to these shortened periods of dehumidifying operation, less sensible heat will be removed from the air than would occur with the use of a modulating type humidiity controller, as shown in Figure 2. The arrangement shown in Figure 3 therefore provides for obtaining dehumidification with a minimum of cooling action, thus permitting effective dehumidification without the necessity of reheat.

While Figures 1 and 2 show the use of modulating humidity controllers which increase the engine speed progressively upon increase in humidity, two-position type of controllers may be substituted therefor if desired, thereby obtaining the same improved results as obtained with the system of Figure 3. The application of a two-position type humidity controller to the systems of Figures 1 and 2 may be as shown in Figure 4, which will now be described.

*Figure 4*

This figure shows the same general type of system as Figure 1 but omits the face and by-pass dampers. This figure also shows the application of a two-position type humidity controller to the system in place of the graduating type controllers shown in Figures 1 and 2.

In this figure the cooling coil 7 extends entirely across the conditioning chamber 1 and is connected to the compressor 12 which is driven by the engine 17, all exactly the same as shown in Figure 1. The reheater 25a also extends across the chamber 1 and the flow of heating medium to this reheater is controlled by a valve 26a actuated by the proportioning motor 33a.

Reference character 150 indicates a two-stage thermostat for controlling the engine speed and the reheat valve 33a. This thermostat is diagrammatically illustrated as comprising a bellows 151 which actuates an arm 152, this arm in turn actuating sliders 153 and 154 which cooperate with resistances 155 and 156 and with contact strips 157 and 158, respectively. When the space temperature is at a low value such as 72° F. the slider 154 will engage the right-hand end of resistance 156 and the slider 155 will engage the contact strip 157. As the space temperature increases to 75° F. the slider 154 will traverse resistance 156, while the slider 153 will contact the contact strip 157. As the space temperature increases above 75° F., the slider 153 will traverse resistance 155 and the slider 154 will engage contact strip 158. The slider 154, resistance 156, and contact strip 158 form a controller for the reheat valve motor 33a, and the slider 153, resistance 155 and contact strip 157 form a controller for the throttle valve 23 of the engine 17.

Referring to the humidity controller 160, as pointed out above it is of the two-position type and may include a humidity responsive element 161 which actuates a switch carrier 162 carrying a double electrode type mercury switch 163. When the relative humidity is below a predetermined value such as 50%, the humidity responsive device 161 will be contracted sufficiently to cause mercury switch 123 to be tilted for bridging its left hand electrodes while when the relative humidity is above this value, the right-hand electrodes of the switch will be bridged.

Referring now to the wiring between the throttle valve motor 23 and the humidity controller 160, the thermostat 150 and the low limit pressure controller 66, this wiring is the same as described in detail in connection with Figure 1. With this wiring arrangement, it will be noted that when the relative humidity is below 50%, terminal W of throttle valve motor 23 will be connected to contact strip 157 of thermostat 150 as follows: terminal W, wire 84, wire 83, right-hand electrodes of mercury switch 163, and wire 80 to contact strip 157. Terminal B of motor 23, it will be noted, is connected by wire 82 to the right-hand end of resistance 155. When the suction pressure is above the low limit value, terminal R of motor 23 is connected to slider 153 as follows: terminal R, wire 78, slider 75, and wire 79 to slider 153. Therefore, when the relative humidity is low and the suction pressure is above the low limit value, the thermostat 150 is in complete control of the throttle valve motor 23. Thus when the space temperature is at an intermediate value as shown, the thermostat 150 will cause the throttle valve 22 to be half-open and this will cause operation of the engine as described in detail in connection with Figure 1. If the space temperature increases to 78° F., the compressor will be run at full speed and if the space temperature decreases to 75° F. the engine speed is gradually reduced and finally the engine is placed out of operation.

If the relative humidity should increase above 50%, the mercury switch 163 of humidity controller 160 will be tilted for unbridging its right-hand electrodes and for bridging its left-hand electrodes. The unbridging of the right-hand electrodes will break the circuit from terminal W of the motor to contact strip 157 of thermostat 150, while bridging of the left-hand electrodes of switch 163 will complete a circuit from terminal B of the motor through wires 82 and 81, left-hand electrodes of switch 163 and wire 80 to the contact strip 157. This action will thus connect both ends of resistance 155 to terminal B of motor 23, and will completely disconnect terminal W of motor 23 from thermostat 150. Thus even when the space temperature is below 75° F. a direct short-circuit between terminals R and B of the motor will be established as follows: terminal R, wire 78, slider 75, wire 79, slider 153, contact strip 157, wire 80, right-hand electrodes of mercury switch 163, wire 81, and wire 82 to terminal B. This will cause the engine to operate at full speed even when the space temperature is relatively low unless the suction pressure controller limits its speed so as to prevent the cooling coil temperature from falling too low. In the event that this operation of the compressor at full speed for providing dehumidification results in the space temperature falling below 75° F., the slider 154 in traversing resistance 156 will cause opening of the reheat control valve 26a for providing the necessary reheat.

From the foregoing description of Figure 4 it should be apparent that when the relative humidity is not excessive the engine speed is placed entirely under the control of the thermostat 150, which increases or decreases the engine speed in a manner for maintaining the space temperature at a proper value. In the event that the relative humidity becomes excessive, the engine will be operated at full speed immediately regardless of space temperature, and if this results in the space temperature falling below 75° F. the reheater will be placed into operation. This action of the humidity controller in causing operation of the compressor at full speed whenever there is a call for dehumidification, provides for shortening the periods that the cooling coil 7 operates for dehumidification, and consequently reduces the amount of reheat necessary to a minimum.

From the foregoing description, it will be apparent that I have provided a control system which is especially adapted for variable speed compressor installations and which operates to maintain space temperature and relative humidity at proper values. While I have shown a few preferred embodiments of my invention, it will be apparent that other modifications which are within the scope of my invention will occur to those skilled in the art. I therefore desire to be limited only by the scope of the appended claims.

I claim as my invention:

1. In an air conditioning system, in combination, a compression refrigeration system for cooling and dehumidifying a space, a compressor for said refrigeration system, a prime mover for driving said compressor, air condition responsive means for controlling the operation of said compressor in accordance with variations in said air condition, and means responsive to the condition of evaporated refrigerant in said system, said refrigerant condition responsive means being arranged in a manner to place said air condition responsive means in control of said compressor when the refrigerant condition is within a predetermined range of values while graduatingly reducing the compressor output as said refrigerant condition varies from said predetermined range.

2. In an air conditioning system, in combination, a compression refrigeration system for cooling a space, a compressor for said refrigeration system, a prime mover for driving said compressor, temperature responsive means for controlling the operation of said compressor in a manner to increase graduatingly the output of said compressor upon an increase in temperature, humidity responsive means for increasing the output of said compressor upon an increase in humidity, said temperature responsive means and said humidity responsive means being interconnected in a manner to condition either means for increasing the compressor output to a substantial value independently of the other, and means responsive to the condition of evaporated refrigerant in said system for graduatingly reducing the output of the compressor as said condition approaches a predetermined value.

3. In an air conditioning system, in combination, a refrigeration system including a compressor for cooling and dehumidifying a space, an internal combustion engine for driving said compressor, a speed controller for said internal combustion engine, temperature and humidity responsive means for actuating said speed controller, said temperature and humidity responsive means being arranged for increasing the speed of said engine upon rise in either temperature or humidity, a controller influenced by the temperature of the evaporated refrigerant for additionally controlling said speed controller, said refrigerant temperature influenced controller being arranged in a manner for placing said temperature and humidity responsive means in control of said speed controller when the temperature of said refrigerant is at a predetermined value, while influencing said controller in a manner to reduce graduatingly the engine speed when the temperature of said refrigerant varies beyond a predetermined value, an automatic starting and stopping circuit for said engine, and means interposed in said circuit for starting said engine when the space temperature rises above a predetermined value.

4. In an air conditioning system, in combination, a conditioning chamber, means for passing air through said conditioning chamber to a space being conditioned, a cooling and dehumidifying device in said chamber, means for actuating said cooling and dehumidifying device comprising a compressor, an internal combustion engine for driving said compressor, a by-pass for the air around said cooling and dehumidifying device, damper means for varying the proportions of the air passing through said device and said by-pass, a speed controller for said internal combustion engine, temperature responsive means for controlling said speed controller and said damper means in a manner to graduatingly increase the flow of air through said cooling and humidifying device to a maximum and then to increase graduatingly the speed of said engine upon rise in temperature, humidity responsive means for additionally controlling said speed controller to increase the speed of said engine upon rise in humidity, starting and stopping circuit means for said engine for placing said engine into and out of operation, and means for controlling said circuit means in a manner to place said engine into operation upon demand for either cooling or dehumidification.

5. In an air conditioning system, an air conditioning chamber, means for circulating air through said chamber and through a space to be conditioned, refrigerating apparatus including an evaporator coil located in said chamber in the path of air flow through the chamber, a by-pass for permitting flow of air around said evaporator coil, damper means for controlling the proportions of air passing in contact with said coil and through said by-pass, variable capacity compressor means for causing flow of refrigerant through said coil at varying rates, means responsive to the temperature of said space in control of said damper means for increasing the flow of air passing in contact with said coil and decreasing the flow of air around said coil in response to a rise in temperature in said space, means actuated in accordance with space temperature for causing the compressor means to operate at high capacity when space temperature is relatively high and to operate at low capacity when space temperature is relatively low, and means actuated by said damper means for preventing operation of the compressor when said damper means is positioned for decreasing the flow of air over said evaporator coil to a minimum.

6. In an air conditioning system, an air conditioning chamber, means for circulating air through said chamber and through a space to be conditioned, refrigerating apparatus including an evaporator coil located in said chamber in the path of air flow through the chamber, a by-pass for permitting flow of air through said chamber around said evaporator coil, damper means for controlling the proportions of air passing in contact with said coil and through said by-pass, variable capacity compressor means for causing flow of refrigerant through said coil at varying rates, means responsive to the temperature of said space in control of said damper means for increasing the flow of air passing in contact with said coil and decreasing the flow of air around said coil in response to a rise in temperature in said space, means actuated in accordance with space temperature for causing the compressor means to operate at high capacity when space temperature is relatively high and to operate at low capacity when space temperature is relatively low, means influenced by humidity for causing the compressor to operate at high capacity upon rise in humidity to a predetermined value, and means actuated by said damper means for preventing operation of the compressor when said damper means is positioned for decreasing the flow of air over said evaporator coil to a minimum.

7. In an air conditioning system, an air conditioning chamber, means for circulating air through said chamber and through a space to be conditioned, refrigerating apparatus including an evaporator coil located in said chamber in the path of air flow through the chamber, a by-pass for permitting flow of air around said evaporator coil, damper means for controlling the proportions of air passing in contact with said coil and through said by-pass, variable capacity compressor means for causing flow of refrigerant through said coil at varying rates, means responsive to the temperature of said space in control of said damper means for increasing the flow of air passing in contact with said coil and decreasing the flow of air around said coil in response to a rise in temperature in said space, means responsive to movement of said damper means to a predetermined position in response to a rise in temperature in the space for causing operation of said compressor means at low capacity, and means responsive either to a rise in humidity in the space to a predetermined value or to a rise in temperature in the space to a predetermined high value for causing operation of said compressor means at high capacity.

8. In an air conditioning system, in combination, a conditioning chamber, means for passing air through said conditioning chamber to a space being conditioned, a cooling and dehumidifying device in said chamber, means for actuating said cooling and dehumidifying device, a by-pass for the air around said cooling and dehumidifying device, damper means for varying the proportions of the air passing through said device and said by-pass, a reheater for reheating the air, and a single controller responsive to a psychrometric condition of the air for sequentially controlling said actuating means, said damper means, and said reheater.

9. In an air conditioning system, in combination, an air conditioning chamber through which air for conditioning a space is adapted to be passed, cooling and dehumidifying means in said chamber, means for supplying actuating medium to said cooling and dehumidifying means, varying means for varying the action of said cooling and dehumidifying means, damper means for controlling the flow of air through said cooling and dehumidifying means, a reheater for reheating the air, space temperature influenced means for sequentially controlling said varying means, said damper means, and said reheater in a manner to place said reheater out of operation, initiate relatively low capacity action of said cooling and dehumidifying means upon rise in space temperature, and humidity responsive means for controlling said varying means independently of said temperature responsive means for causing action of said cooling and dehumidifying means at a relatively high capacity when space relative humidity exceeds a predetermined value.

10. In an air conditioning system, a conditioning chamber, means for passing air through said chamber to a space being conditioned, cooling and dehumidifying means in said chamber, variable speed compressor means for said cooling and dehumidifying means, multi-position control means for said variable speed compressor means, temperature responsive means for positioning said control means in a multiplicity of positions for graduatingly controlling the speed of said compressor means in accordance with variations in temperature, two-position type humidity influenced means for either operating said compressor means at a predetermined high speed when the relative humidity is above a desired value, or placing said compressor means under the control of said temperature responsive means when the relative humidity is below said predetermined value, and means influenced by the temperature of the cooling and dehumidifying means for also positioning said control means in a multiplicity of positions for graduatingly limiting the speed of said compressor means as said last mentioned temperature approaches a predetermined value.

11. In an air conditioning system, in combination, a heat exchanger for cooling and dehumidifying a stream of air passing to a space being conditioned, means including variable speed compressor means connected to said heat exchanger for supplying liquid refrigerant to said heat exchanger and withdrawing evaporated refrigerant therefrom, a controller for varying the speed of said compressor means in a multiplicity of steps, a reversible motor for positioning said controller in a multiplicity of positions, thermostatic control means for controlling said reversible motor, said thermostatic control means operating said reversible motor to a multiplicity of positions to vary graduatingly the speed of the compressor means in accordance with requirements for sensible cooling, and two-position type humidity influenced means for also controlling said reversible motor, said humidity influenced means acting to cause movement of said motor to a position requiring operating of the compressor means at high speed when dehumidification is required while placing said motor under the control of said thermostatic means when dehumidification is not required.

12. In an air conditioning system, in combination, a heat exchanger for cooling and dehumidifying a stream of air passing to a space being conditioned, means for supplying cooling medium to said heat exchanger, a controller for varying the temperature of said heat exchanger in a multiplicity of steps, a multi-position reversible motor for positioning said controller, thermostatic control means for controlling said reversible motor, said thermostatic control means operating said reversible motor to a multiplicity of positions to vary graduatingly the temperature of the heat exchanger in accordance with requirements for sensible cooling, and two-position type humidity influenced means for also controlling said reversible motor, said humidity influenced means acting to cause movement of said motor to a position causing the heat exchanger to operate at a minimum temperature when dehumidification is required while placing said reversible motor under the control of said thermostatic means when dehumidification is not required.

13. In an air conditioning system, in combination, a heat exchanger for cooling and dehumidifying a stream of air passing to a space being conditioned, means for supplying cooling medium to said heat exchanger, a controller for varying the temperature of said heat exchanger in a multiplicity of steps, a multi-position reversible motor for positioning said controller, thermostatic control means for controlling said reversible motor, said thermostatic control means operating said reversible motor to a multiplicity of positions to cause the temperature of the heat exchanger to be relatively low when the sensible cooling load is relatively high and to cause the temperature of the heat exchanger to be increased in a number of steps as the sensible cooling load gradually becomes lower, and two-position type humidity influenced means for also controlling said reversible motor, said humidity influenced means causing said heat exchanger to be operated only at relatively low temperature when dehumidification is required.

14. In an air conditioning system, in combination, an air conditioning chamber through which air for conditioning a space is adapted to be passed, cooling and dehumidifying means in said chamber, varying means for varying the action of said cooling and dehumidifying means, damper means for controlling the flow of air through said cooling and dehumidifying means, space temperature influenced means for controlling said damper means so as to cause said damper means to move from a minimum position upon the space temperature assuming a predetermined value and thereafter to cause said damper means to increase the rate of air flow across said cooling and dehumidifying means as said space temperature rises, a controller associated with said damper means and with said varying means to prevent operation of said cooling and dehumidifying means when the damper means is in its minimum position, and humidity responsive means associated with said controller for controlling said varying means independently of said temperature responsive means whenever said damper means is in other than said minimum position for causing action of said cooling and dehumidifying means at a relatively high capacity upon a rise in space relative humidity.

15. In an air conditioning system having an air conditioning chamber and means for circulating air through said chamber to a space, refrigerating apparatus including an evaporator located in said chamber and a compressor, an internal combustion engine for driving said compressor, a speed controller for said internal combustion engine, a starting device therefor, a reversible motor for positioning said controller and starting device, means responsive to a rise in temperature of the space to a predetermined value for controlling said motor in a manner to cause movement of said starting device to engine starting position and upon a further rise in temperature to adjust the position of said speed controller, and means responsive to a rise in humidity in the space to a predetermined value for controlling said motor in a manner to cause operation of the compressor means at high capacity.

16. In an air conditioning apparatus having an air conditioning chamber and means for circulating air through said chamber to a space, refrigerating apparatus including an evaporator located in said chamber, said refrigerating apparatus also including a variable capacity compressor means having a current operated regulator therefor, damper means for controlling the flow of air across said evaporator coil, means including a proportioning motor for positioning said damper means, a space temperature responsive controller connected to said proportioning motor for causing the same and hence said damper means to assume a position proportional to that of said controller, a current controlling device positioned by said proportioning motor, connections between said current controlling device and said compressor regulator to control said compressor means, a further current controlling device positioned in accordance with the humidity in said space, and electrical connections between said further current controlling device, said first named current controlling device, and said regulator operative upon said humidity attaining a high predetermined value to cause said regulator to effect operation of said compressor means at high capacity even though said compressor means would otherwise be operated at low capacity.

WILLIAM L. McGRATH.